United States Patent [19]
Chen et al.
[11] Patent Number: 4,460,969
[45] Date of Patent: Jul. 17, 1984

[54] IMAGE SPECTRUM ANALYZER FOR CARTOGRAPHIC FEATURE EXTRACTION

[75] Inventors: Pi-Fuay Chen, Alexandria; Frederick W. Rohde, Fairfax Station; William W. Seemuller, Springfield, all of Va.

[73] Assignee: The United States of America as represented by the Secretary of the Army, Washington, D.C.

[21] Appl. No.: 212,766

[22] Filed: Dec. 4, 1980

[51] Int. Cl.³ .......................... G06G 9/00; G06K 9/00

[52] U.S. Cl. .................................... 364/727; 364/713; 382/16; 382/43; 382/48

[58] Field of Search ............... 364/713, 727, 822, 827, 364/525; 382/16, 19, 26, 43, 48

[56] References Cited

U.S. PATENT DOCUMENTS

| | | | |
|---|---|---|---|
| 3,509,565 | 4/1970 | Wilmotte | 364/516 |
| 3,638,025 | 1/1972 | Dishington et al. | 364/516 |
| 3,775,602 | 11/1973 | Alexandridis et al. | 364/727 |
| 3,795,864 | 3/1974 | Fullton | 364/727 |
| 3,816,735 | 6/1974 | Bromley | 364/713 |
| 4,009,380 | 2/1977 | Bocker et al. | 364/713 X |
| 4,055,756 | 10/1977 | Jolivet et al. | 364/727 |
| 4,122,521 | 10/1978 | Rick et al. | 364/516 |
| 4,139,897 | 2/1979 | Gardner et al. | 364/827 |
| 4,164,788 | 8/1979 | Jain | 364/525 |
| 4,167,729 | 9/1979 | Christenson et al. | 364/516 |

OTHER PUBLICATIONS

Kitai et al.: Using a Microprocessor in a Walsh-Fourier Spectral Analyzer, Computer, Apr. 1976, pp. 27-32.
Venkatesam: A Walsh Spectral Analyser, Int. Journal of Electronics, Apr. 1979, vol. 46, No. 4 pp. 413-415.
Feangakis et al.: A Digital Walsh Function Analyser, Electronic Engineering, Jul. 1979, vol. 51, No. 625, pp. 89-91.

*Primary Examiner*—Felix D. Gruber
*Attorney, Agent, or Firm*—Darrell E. Hollis

[57] ABSTRACT

An image spectrum analyzer and method for cartographic feature extraction comprising an image, means for generating a Walsh function light pattern and for illuminating the image with the Walsh function light pattern to procuce a masked pattern, and means for receiving the masked pattern and for producing an electrical signal in accordance with same. A digital signal can be provided in accordance with the electrical signal, and a digital data processor under stored program control can provide a Walsh transform coefficient representative of the digital signal. More than one Walsh function light pattern can be generated by the apparatus and method of the present invention to produce more than one masked pattern, and representative Walsh coefficient. The Walsh coefficients can be used to perform cartographic feature extraction of the image.

39 Claims, 11 Drawing Figures

SEE FIG. 4B

SEE FIG. 4A

IMAGE SPECTRUM ANALYZER FOR CARTOGRAPHIC FEATURE EXTRACTION

BACKGROUND OF THE INVENTION

The present invention relates generally to electrooptical analyzers and, more particularly, to an image analyzer which produces one or more Walsh transform coefficients corresponding to the Walsh transform of the image being analyzed.

Electrical and/or optical analyzers of images are well known. Some such analyzers produce an image signature using matching techniques between the image and a stored image, such as that shown in U.S. Pat. No. 4,167,729 to Christenson et al. The Christenson et al patent shows an apparatus for obtaining multi-spectral signatures, and employs a digital computer 12. A base of digitized multi-spectral image data is stored in a random access storage device 33, and is representative of a scene scan from a remote, moving object, such as an aircraft or satellite. The digital data is stored in a two-dimensional format and can be broken up into individual pixel elements. The stored image is compared by an operator with known images to obtain the desired spectral signatures. It is thus apparent that the Christenson et al system requires the digitization of the scan image prior to obtaining the desired spectral signature.

Another optical analyzer approach obtains the Fourier transform coefficients of the image being analyzed in order to detect a desired feature. Typically, a source of coherent light, such as a laser, is used to scan the image and the energy reflected by the image is converted by a detector into an electronic signal which is broken down into its Fourier transformer coefficients. Representative of such an imaging system is U.S. Pat. No. 4,164,788 to Jain.

The Jain reference teaches obtaining the Fourier transform of the wave field, which is obtained by a detector at a point on the image plane of the object as the angle, wavelength or distance from the object of the coherent wave source is varied to provide through an inverse Fourier transform calculation by a processor enhanced image data of the object, with the resolution cell centered at the corresponding point of the object. Alternately, only the intensity of the wave field may be detected as a Fourier spectrum at a point on the image plane, and the Fourier transform of the intensity is the auto-correlation of the transform of the wave field variation with wavelength.

In addition to breaking up the image being analyzed into its Fourier components, it has been suggested that Walsh functions may also act as a useful transform to obtain desired image detection capability. The noted mathematician J. L. Walsh submitted a paper in 1923 to the *American Journal of Mathematics* describing a newly discovered orthogonal set of bipolar, rectangular functions, now generally referred to as Walsh functions. See U.S. Pat. No. 3,795,864 to Fullton Jr. which describes Walsh functions and shows a digital electronic device for producing same.

The Walsh function has sometimes been referred to as the binary Fourier transform. Several practical uses for Walsh functions have arisen since the development of solid state digital electronics. Walsh functions have been employed for signal processing and multiplexing, and have also been used for band-width reduction systems. Several attempts have been made to use Walsh functions in optical recognition system by first converting the image being analyzed into its corresponding digital representation, and then converting the transformed electronic matrix into its corresponding Walsh transform components to achieve desired image identification. Representative of such an approach is U.S. Pat. No. 3,775,602 to Alexandridis et al. U.S. Pat. No. 4,055,756 to Jolivet et al. shows a similar digitization approach using Hadamard transform matrices.

Because the image in such systems must first be digitized and stored before the Walsh transform components can be obtained electronically, an extremely large amount of computer capability must be employed to produce each of the Walsh coefficients for the image being analyzed. This high computer capability requirement is due to the fact that each pixel element of the digitized image must be multiplied with its corresponding pixel element of the particular Walsh transform function that it is being compared to, and then all of these pixel multiplications must be summed to obtain the Walsh coefficient for the entire picture being scanned. Thus, for example, in the case where a 250,000 Walsh coefficients are produced by obtaining a 512×512 two-dimensional Walsh transform, it is seen that the computer power required to obtain such Walsh coefficients would be prohibitive.

OBJECTS OF THE PRESENT INVENTION

It is an object of the method and apparatus of the present invention to overcome the above-noted deficiencies.

Specifically, it is an object of the present invention to obtain optically a masked pattern for each Walsh function light pattern optically multiplied with the image, and to produce a corresponding Walsh coefficient from the masked pattern.

In addition, it is an object of the present invention to produce the Walsh coefficient for each Walsh function light pattern without first requiring the image being analyzed to be digitized.

Finally, it is an object of the present invention to obtain the Walsh coefficient by measuring the light intensity level of the masked pattern produced by optically multiplying the image being analyzed with a Walsh function light pattern.

SUMMARY OF THE INVENTION

The apparatus and method of the present invention produces a Walsh coefficient by optically multiplying the respective Walsh function light pattern with the image being analyzed, and then measuring the light intensity level of the resultant masked pattern to produce an electrical signal in accordance with the Walsh coefficient.

Specifically, the apparatus of the present invention comprises a means for generating a Walsh function light pattern, a transparency means for receiving the Walsh function light pattern and for producing a masked pattern, and a first means for receiving the masked pattern and for producing an electrical signal in accordance with same. Alternately, the apparatus of the present invention comprises an image, first means for generating a Walsh function light pattern and for illuminating the image with the Walsh function light pattern to produce a masked pattern, and second means for receiving the masked pattern and for producing an electrical signal in accordance with same.

The image can comprise a photo-negative or a transparency. The means for generating the Walsh function light pattern can comprise Walsh function generator means for generating a control signal representative of the Walsh function light pattern, driver means responsive to the control signal for producing a driving signal in accordance with same, and display means for receiving the driving signal for producing the Walsh function light pattern in accordance with the driving signal, and for illuminating the image with the Walsh function light pattern to produce the masked pattern. More than one Walsh function light pattern can be produced. Each Walsh function light pattern effectively produces a corresponding Walsh coefficient. he display means can comprise a plasma discharge device.

The means for receiving the masked pattern and for producing the electrical signal in accordance with same can comprise sensor means having a light sensor surface for supplying an output signal in accordance with the light intensity at the light sensor surface, and optical means for conveying the masked pattern to the light sensors surface. The optical means can be a lens disposed on one side approximately one focal length from the masked pattern and disposed on the other side adjacent to the sensor means. The sensor means can be a photomultiplier tube.

In addition, the apparatus of the present invention can further comprise coefficient processor means for receiving the electrical signal and ,for producing a digital signal in accordance with same. The coefficient processor means can comprise buffer means for receiving the electrical signal and for supplying a buffered electrical signal in accordance with same, and analog to digital converter means for receiving the buffered electrical signal and for providing the digital signal representative of same.

The apparatus can further comprise digital data processor means under stored program control for receiving the digital signal. The digital data processor means under stored program control can comprise central processor means under stored program control responsive to the digital signal, input terminal means connected to the central processor means for supplying input information to the central processor means, cathode ray tube display means connected to the central processor means for visually displaying information form the central processor means and printer means connected to the central processor means for printing information from the central processor means.

The method of the present invention comprises the steps of providing an image to be transformed, generating a Walsh function light pattern, illuminating the image with the Walsh function light pattern to produce a masking pattern, and producing an electrical signal in accordance with the masked pattern, whereby the electrical signal is representative of the Walsh coefficient of the particular Walsh function light pattern multiplied with the image. More than one Walsh coefficient can be generated for any given image in accordance with the method of the present invention.

The method can further comprise the step of converting the electrical signal to a corresponding digital signal. In addition, the method can further include processing the electrical signal fo obtaining the Walsh function coefficient. The step of processing can employ a digital data processor under stored program control. Finally, the Walsh coefficient can be visually displayed, can be printed, or can be stored by using either electronic or magnetic means.

The step of generating the Walsh function light pattern, can comprise the steps of generating a driving signal indicative of the Walsh function light pattern and producing the Walsh function light pattern in accordance with the driving signal. The step of producing an electrical signal in accordance with the mask pattern can comprise the steps of conveying the mask pattern to a first region, and transforming the mask pattern at said first region into a corresponding electrical signal.

DETAILED DESCRIPTION OF THE PREFERRED EMBODIMENT

Figure 1:
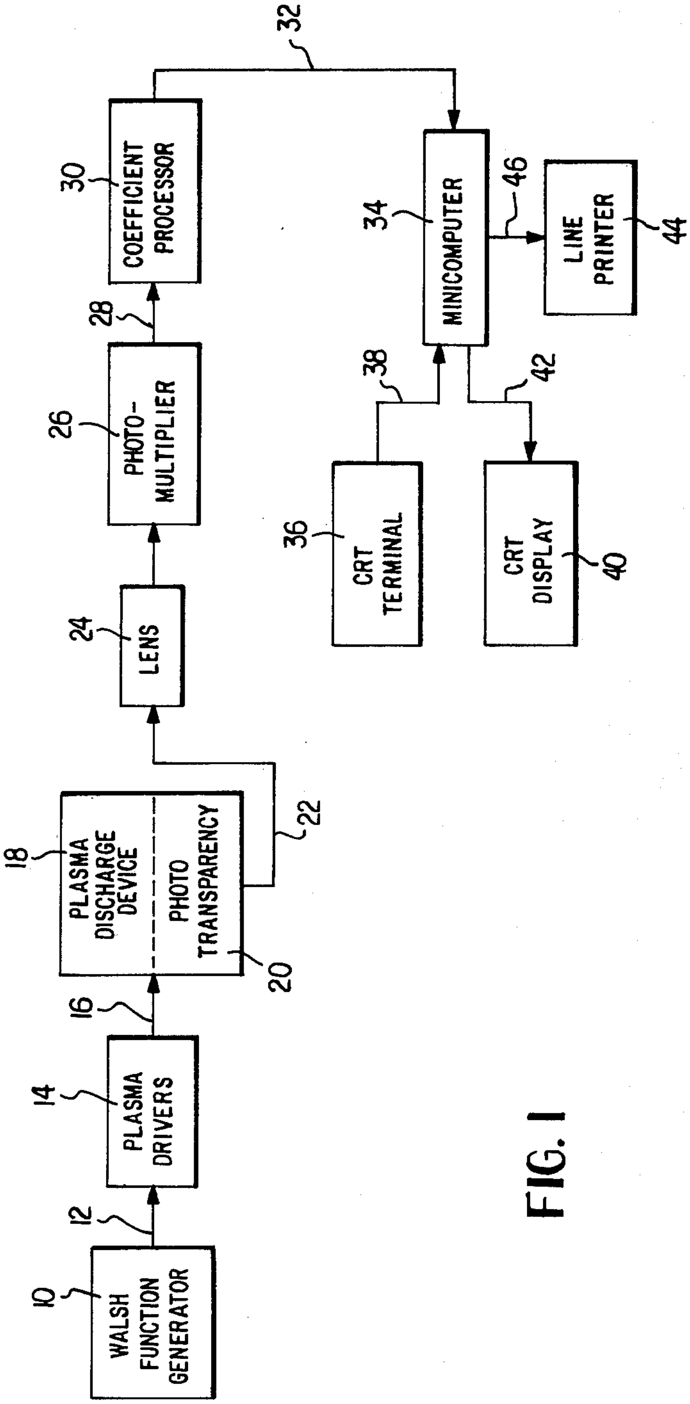
FIG. 1 shows the system block diagram of the present invention.

The image spectrum analyzer for cartographic feature extraction of the present invention is shown in block diagram form in FIG. 1.

The system of the present invention comprises a two-dimensional, digital, Walsh function generator 10, which generates a control signal 12 in accordance with a Walsh function light pattern which is to be generated and used to illuminate an image to be analyzed. The control signal 12 is provided as an input signal to a plasma driver stage 14, which generates a driving signal 16 in response to the control signal 12. The driving signal 16 is supplied as the input to a display or plasma discharge device 18. The plasma discharge device 18 generates a Walsh function light pattern (see FIG. 2) in accordance with the driving signal 16. This Walsh function light pattern is used to illuminate an image or phototransparency 20 to produce a masked pattern 22.

The masked pattern 22 produced by the illumination of the image or phototransparency 20 by the Walsh function light pattern generated by the plasma display device 18 is conveyed optically by a optical system 24 to the light sensor surface of a sensor 26. The sensor 26 supplies an output signal 28 in accordance with the light intensity on its sensor surface, which intensity has a level which is in accordance with the total amount of light of the masked pattern. The output signal 28 is supplied as the input to an coefficient processor 30, which first buffers the output signal 28 and then converts it into a digital signal 32 representative of the output signal 28. The digital signal 32 is buffered (not shown) and then supplied to an input port of a digital data processor 34 under stored program control. The digital data processor or minicomputer 34 further comprises a cathode ray tube terminal 36 which is connected via a bus 38 to minicomputer 34, a cathode ray tube display 40 which is connected via a bus 42 to the minicomputer 34, and a line printer 44 which is connected by a bus 46 to the minicomputer 34. The minicomputer 34 under stored program control in combination with the cathode ray tube terminal 36, the cathode ray tube display 40 and the line printer 44 supplies a Walsh coefficient corresponding to the masked pattern.

Any number of Walsh function light patterns in any desired sequence can be used to illuminate the image or phototransparency 22. Each Walsh function light pattern produces a masked pattern, which masked pattern is converted into a Walsh coefficient. The Walsh function light patterns can be provided sequentially, for example, so as to produce masked patterns and corresponding Walsh coefficients sequentially. These Walsh coefficients can be stored in the memory or suitable peripheral device of the minicomputer 34, and the coefficient can be used to provide numerical data for cartographic feature extraction of the image or phototransparency 20 being analyzed. Because two-dimensional Walsh function light patterns are generated and used to illuminate the image or phototransparency 20, a plurality of the Walsh function light patterns effectively produces a two-dimensional matrix of Walsh coefficients, which matrices are described in detail below.

The Walsh function generator 10 and the plasma drivers 14 produce a driving signal which causes the plasma discharge device 18 to generate a specific Walsh function light pattern. The Walsh function generator 10 and the plasma driver 14 can generate driving signals which cause any selected number of two-dimensional Walsh function light patterns to be provided. For example, two-dimensional Walsh function light patterns of order up to $512\times512$ can be generated in any sequence by the present invention.

Figure 2:
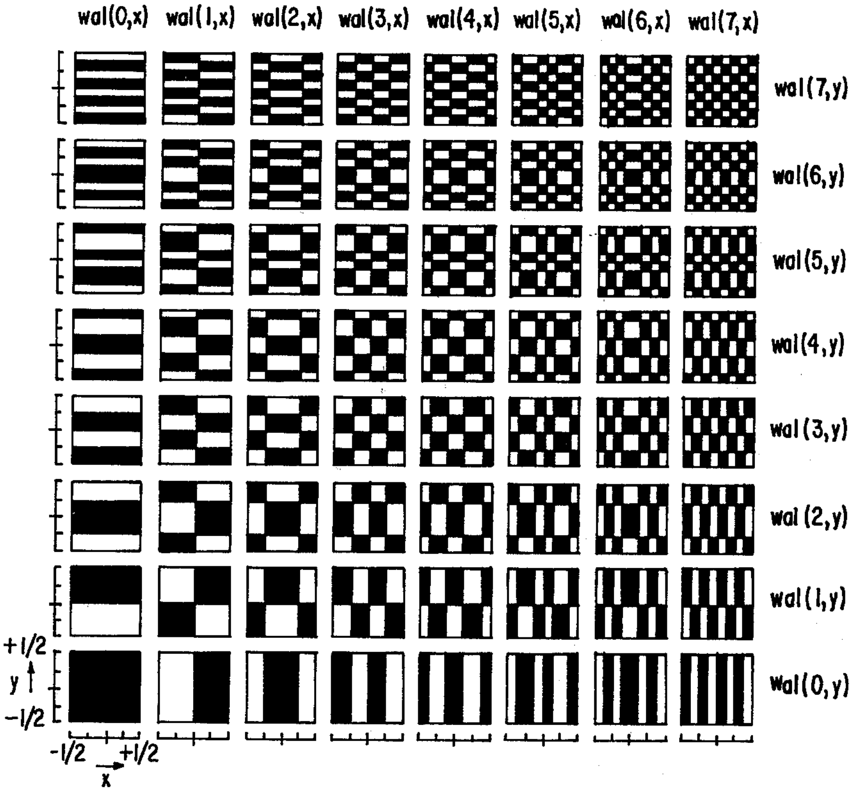
FIG. 2 illustrates the first 8×8 lower order two-dimensional Walsh functions.

For purposes of explanation, the first $8\times8$, lower order, two-dimensional Walsh function light patterns are illustrated in FIG. 2. The black areas of each light pattern represent that the plasma light is on, whereas the white areas represent that the plasma light is off.

Two dimensional Walsh functions are well known at least in the mathematical art. For example, reference in this regard is made to the following standard text which is incorporated by reference herein: Harmuth, H. F., *Sequency Theory, Foundations and Applications,* Academic Press, New York, 1976.

Any sequence can be employed by the present invention for the generation of the two-dimensional Walsh function light patterns. It has been found that a useful sequence is to produce the Walsh function light patterns as follows: Wal(0,0), Wal(0,1), Wal(0,2), . . . , Wal(0,511), Wal(1,0), . . . , Wal(2,0), . . . Wal(511,511). This preferred sequence when applied to the first $8\times8$, lower order, two-dimensional Walsh function light patterns of FIG. 2 would result in the bottom left Walsh function light pattern being generated first, followed by the sequential generation by the next most adjacent patterns on this column until each of the patterns on this column have been generated, followed by the generation of the bottommost pattern on the second column, and so forth until the top rightmost pattern is generated.

Figure 3:
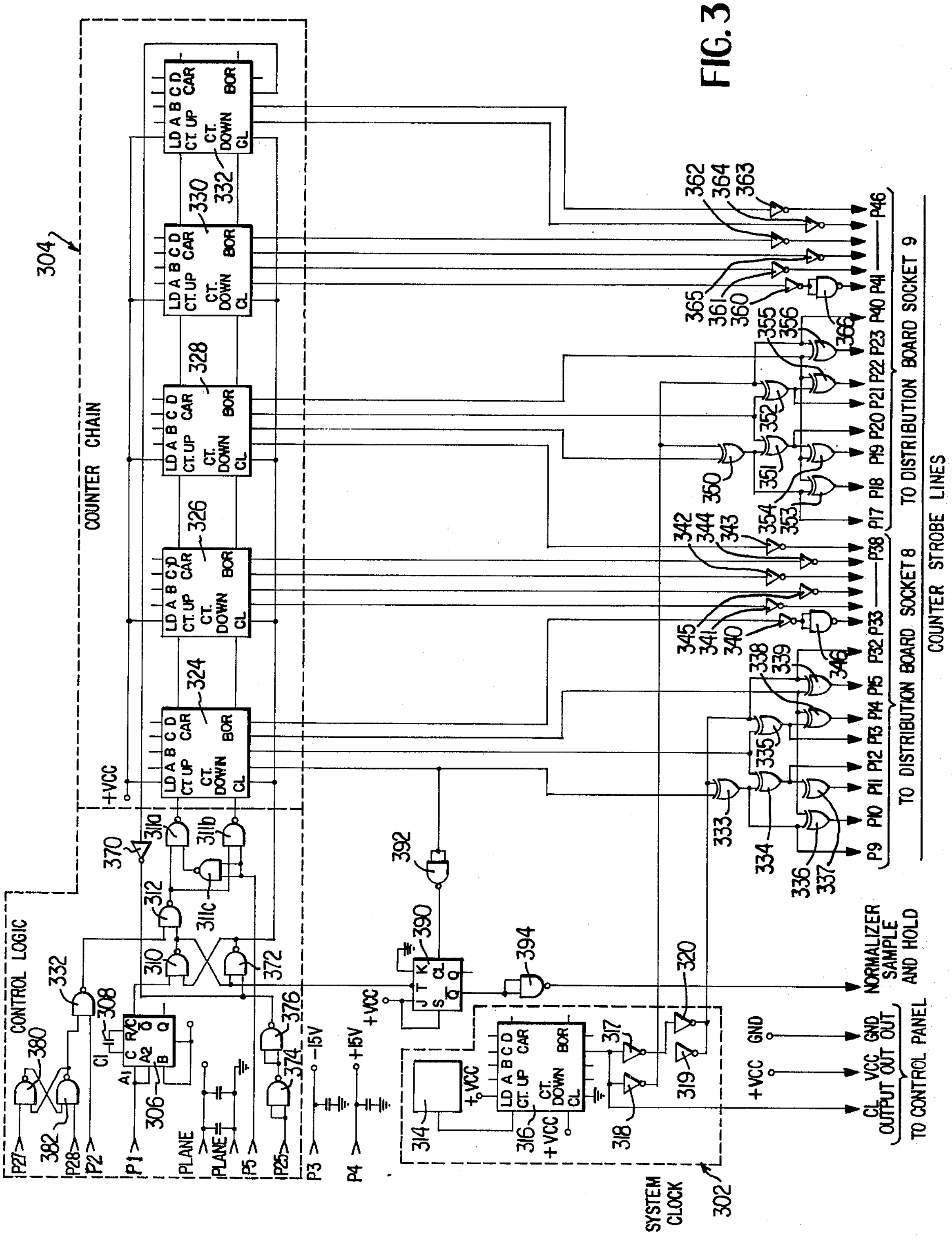
FIG. 3 shows a schematic diagram of the Walsh function generator 10 of FIG. 1.

The two-dimensional Walsh function generator 10 used to generate the control signal 12 corresponding to the Walsh function light pattern to be generated is shown schematically in FIG. 3. As stated above, the Walsh function generator 10 is designed to produce Walsh function patterns in the sequence: Wal(0,0), Wal(0,1), Wal(0,2) . . . , Wal(0,511), Wal(1,0), . . . , Wal(2,0), . . . , Wal(511,511).

In the automatic running mode of the present invention the control signal 12 is produced for each Walsh function light pattern that is to be displayed. In the manual switching mode, the control signal 12 for any selected Walsh function light pattern can be generated either for inspection and/or demonstration purposes.

Referring again to FIG. 3, there is shown: the Walsh function generator 10 comprises most of the control logic 300 that the user or operator interfaces with when operating the system of the present invention; a system clock 302; an 18-bit binary counter chain 304; and a small amount of the Walsh function logic, which is that circuitry not contained within any of the other dashed-lined blocks noted above.

Figure 5:
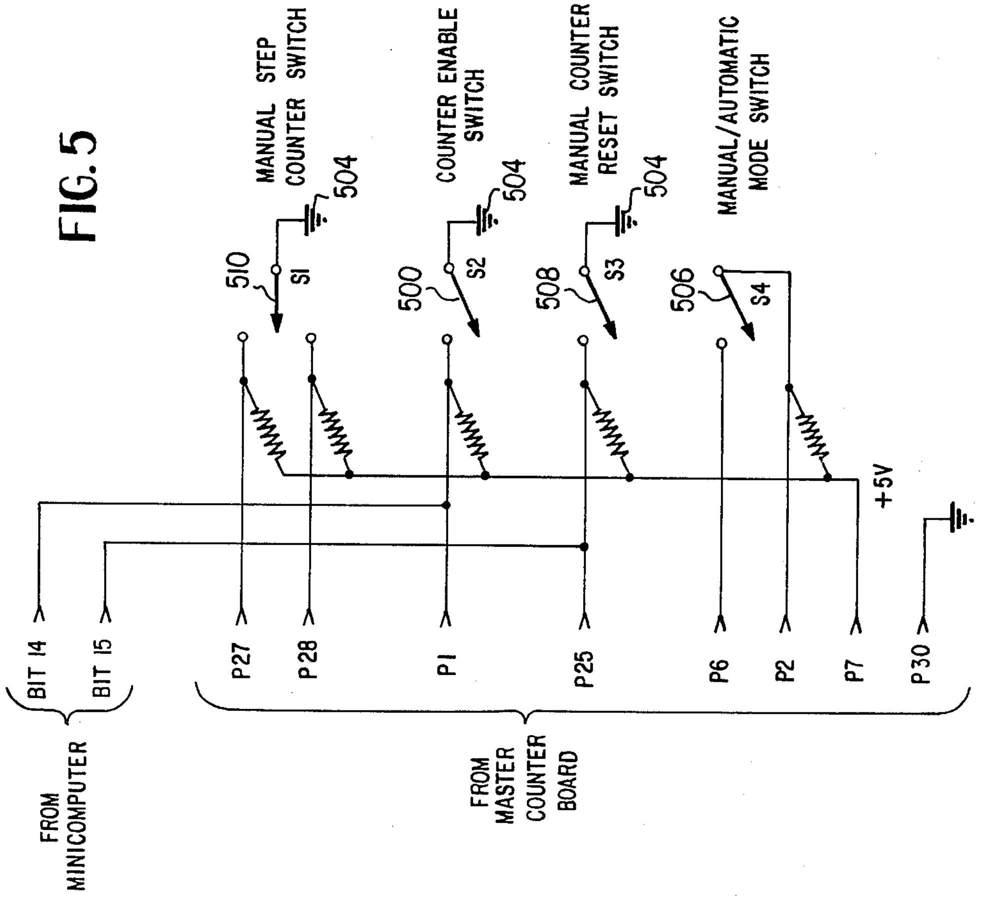
FIG. 5 shows a schematic diagram of the switches of the control panel used with the Walsh function generator 10 of FIG. 3.

The circuitry of the operator control panel for controlling the operation of the present invention is shown in schematic form in FIG. 5. A counter-enable switch 500 connects interconnection P1 of FIG. 3, bit 14 from minicomputer 34 and interconnection P7 of FIG. 3 through a resistor 502 to electrical ground 504. Referring again to FIG. 3, a one shot 306 is shown. The one shot 306 is of conventional design and can be a model 74121 made by Texas Instruments of Dallas, Tex. A capacitor 308 is connected to pins 10 and 11, whereas pins 5 and 9 are connected to a source of positive DC voltage (not shown). Pins 3 and 4 of one shot 306 are connected to interconnection P1.

When switch 500 is closed, this grounding of interconnection P1 fires the one shot 306, which causes its output $\overline{Q}$ at pin 1 to go to the low electrical state. The output $\overline{Q}$ of one shot 306 is provided to one of the inputs of a NAND gate 310 of a RS flip-flop comprising NAND gate 310 and a NAND gate 372. Output 6 of NAND gate 310 goes to the high state when output $\overline{Q}$ of one shot 306 goes to the low electrical state. The output at pin 6 of NAND gate 310 is provided to one of the inputs of an NAND gate 312. When the output of NAND gate 310 at pin 6 goes to the high electrical state, a strobe signal appears at the output of NAND gate 312. The clock output from the system clock 302 is then passed through NAND gate 312 at its output and is used to drive the counter chain 304 after being passed through NAND gates 311*a*, 311*b* and 311*c*.

The system clock 304 includes a crystal oscillator integrated circuit 314, which provides at an output 1 a TTL compatible clock output signal at a preselected frequency, such as 256 kHz. The crystal oscillator 314 is of conventional design. The output of the crystal oscilllator 314 is provided to the count up input 5 of a binary counter 316, of conventional design, such as a Model 74193 by Texas Instruments. The binary counter divides the clock input signal by a preselected denominator. In the present invention, the binary counter 316 divides the input clock signal by 16 to yield a 16 kHz. square wave clock signal at its output Qc at pin 6. This clock signal is provided to a clock output interconnection P6, and is modified for other clocking functions in the system by four inverters 317–320.

The clock output at interconnection P6 is provided to a manual/automatic mode switch 506 of FIG. 5. When switch 506 is in the automatic mode or closed electrical state (not shown), the clock signal is provided to an interconnection P2, which is connected to one of the inputs of a NAND gate 332 of FIG. 3. The output of NAND gate 332 is connected to the other input of NAND gate 312. In this way, it is seen that the clock signal is only provided effectively to the counter chain 304 when switch 506 is in the closed state and input 2 of NAND gate 312 is in the high electrical state.

The cloc signal from the output of inverters 319 and 320 is used to drive directly the X-Walsh function generator logic (See FIG. 4) connected to distribution board socket 8, whereas the complement of the clock signal present at the outputs of inverters 317 and 318 is used to drive the Y-Walsh function generator logic (see FIG. 4) connected to the distribution board socket 9, as shown in FIG. 3.

The counter chain 304 effectively causes the generation of all of the strobes 1X–9X and 1Y–9Y provided at the distribution board sockets 8 and 9 respectively. Counter chain 304 includes five synchronous four-bit up-down binary counters 324, 326, 328, 330 and 332, respectively. These binary counters are wired in tandem. The binary counters are of conventional design, and each can be a model 74193 made by the Texas Instruments. The strobes 1X, 2X, and 3X are generated by the outputs 3, 2 and 6, respectively, of binary counter 324. These three strobes are decoded by exclusive OR gates 333, 334, 335, 336, 337, 338, and 339, to produce Walsh function codes 3X*a* to 3X*h*.

As stated below with respect to FIG. 4, the present invention includes 8 X plasma tube driver boards and 8 Y plasma driver boards when a 512×512 two-dimensional Walsh function light pattern is to be generated. In such a case, the interconnections P9, P10, P11, P12, P13, P134, P15 and P32, corresponding respectively to the Walsh function codes 3X*h* to 3X*a*, are provided by the distribution board socket 8, and are each provided thereby to a respective one of the X plasma tube driver boards.

It should be understood that the Walsh function generator 10 of the present invention can be used to generate Walsh function codes for any selected size Walsh function light pattern, and is not limited to the 512×512 pattern or the 8×8 pattern described herein.

The 4X strobe from counter 324, the 5X, 6X, 7X, 8X strobe from the counter 326, and the 9X strobe from the counter 328 are effectively provided by inverters 340, 341, 342, 343, 344 and 345 and NAND gate 346 as strobes 4X–9X present at interconnections P33, P34, P35, P36, P37 and P38 of distribution board socket 8 of FIG. 3. These strobes 4X–9X are provided to each of the X-axis plasma tube driver boards of the present invention, and each of these strobes is purely binary in nature.

The same sequence of strobes 3Y*a*–37*h* and 4Y–9Y are repeated for the Y-axis plasma tube driver boards. The only diffeence is that the Y-strobes are higher up on the counter chain 304. The Y strobes start with the tenth bit of the chain; therefore, for every time a Y-strobe changes the X strobe goes through all 512 possible combinations.

Specifically, the strobes 1Y, 2Y and 3Y from counter 328 are supplied to exclusive OR gates 350, 351, 352, 353, 354, 355, and 356. These exclusive OR gates produce at interconnections P17, P18, P19, P20, P21, P22, P23 and P40 a Walsh function code 3Y*a*–3Y*h*. Each one of these codes is provided to a different Y-axis plasma tube driver board.

The next six strobes 4Y–9Y from the counter chain 304, which are purely binary in nature, are provided by the inverters 360, 361, 362, 363, 364, 365 and NAND gate 366 to each of the Y-axis plasma tube display boards by interconnections P41, P42, P43, P44, P45 and P46 of the distribution board socket 9 of FIG. 3.

When the counter chain 304 has completely cycled through a count, it reset itself through an inverter 370 by resetting the RS flip-flop at input 10 of NAND gate 372. This resetting of the RS flip-flop locks out the clock input provided at input 1 of NAND gate 312.

The RS flip-flop may now be reset by the counter reset switch 508 of FIG. 5. The closing of switch 508 electrically grounds the interconnection P25 and bit 15 from minicomputer 34. As shown in FIG. 3, interconnection P25 is connected to each of the two inputs of a NAND gate 374, whose output is connected to each of the inputs of a NAND gate 376. The output of NAND gate 376 is connected to input 10 of the NAND gate 372 of the RS flip-flop.

Thus, it can be seen that the RS flip-flop may also be reset by the manual counter reset switch 508 in addition to the automatic reset which is provided when the counter 304 reaches the end of the count and resets the RS flip-flop at input 10 of NAND gate 372, as described above.

With switch 506 in the open state, the operator can manually step the counter 304 through each of its states by toggling in the appropriate direction a switch 510 as shown in FIG. 5. Toggling switch 510 upwardly causes interconnection P27 to be electrically grounded, which causes a RS flip-flop made up of NAND gate 380 and NAND gate 382, to change state. As shown in FIG. 3, the output of this RS flip-flop is provided to input 10 of NAND gate 322, which provides the counter clock signal at its other input to its output when this RS flip-flop is in the high state. Toggling switch 510 downwardly, as shown in FIG. 5, causes interconnection P28 to be electrically grounded. As shown in FIG. 3, interconnection P28 is connected to an input of NAND gate 382 of the RS flip-flop.

Thus, as shown in FIG. 5, the Walsh function generator 10 of FIG. 3 operates in the automatic mode when switches 500 and 506 are both closed. Conversely, the Walsh function generator 10 operates in the manual mode, which allows the operators to step through each of the Walsh functions that can be generated, when switch 506 is open, switch 508 is closed to reset the counter chain 304, and toggle switch 510 is used then to sequence the counter chain 304 until the desired Walsh function is generated thereby.

Finally, the sample strobe provided to the coefficient processor 30 by the Walsh function generator 10 at interconnection P29, is provided by a JK flip-flop 390 (of conventional design) and an associated NAND gate 392 and a NAND gate 394, as shown in FIG. 3.

The driver signal 16 provided by the plasma driver 14 of FIG. 1 is now described with reference to FIG. 4.

As stated above, the Walsh function generator 10 can provide control signals for generating up to a 512×512 two-dimensional Walsh transform light patterns. For purposes of explanation, the circuitry for providing the driving signals for 64 of one direction (either X or Y) of a two-dimensional Walsh function light pattern is shown in FIG. 4. For purposes of explanation only, the X axis driving signals are generated by FIG. 4. Obviously, the circuitry of FIG. 4 can be modified to allow any desired size Walsh function light pattern to be generated.

Figure 4A:
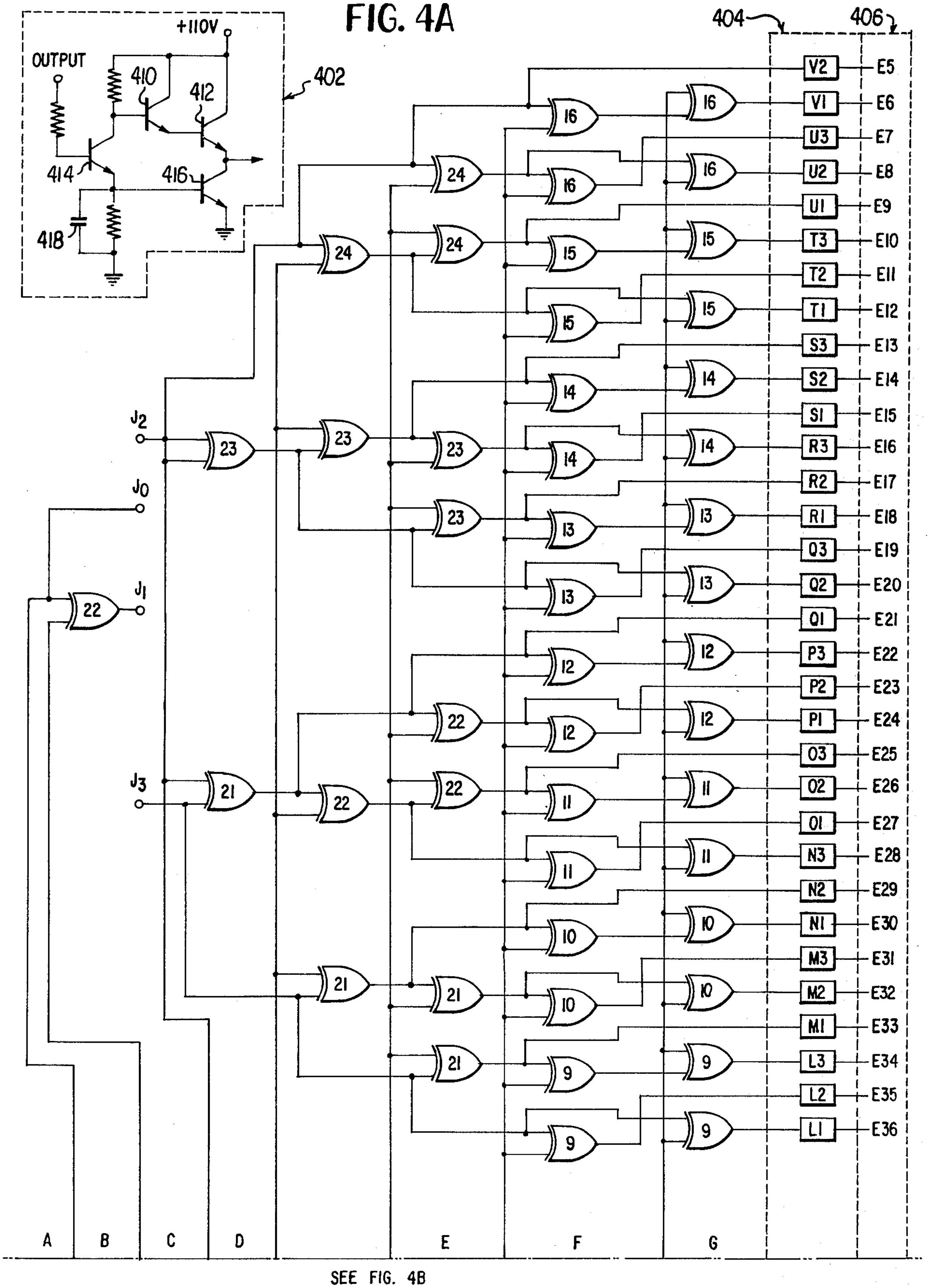
FIGS. 4A, 4B taken together show a schematic diagram of the plasma drives 14 of FIG. 1.
Figure 4B:
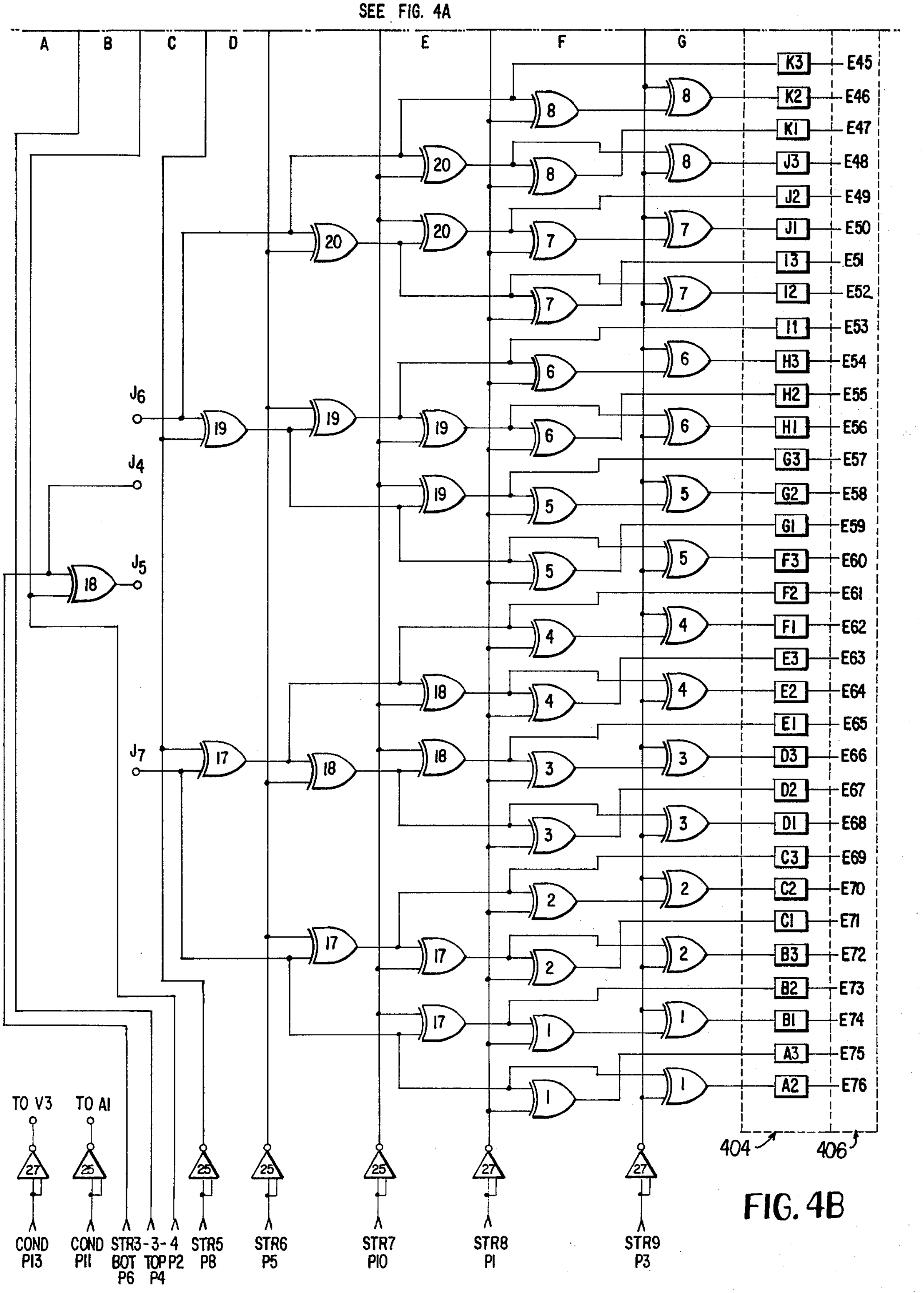

As shown in FIG. 4, a plurality of exclusive OR gates are connected together and to the corresponding X-axis strobe signals from the Walsh function generator 10 of FIG. 3 to produce 64 X-axis driving signals, which are provided to the plasma discharge device 18.

The plasma discharge device 18 is a high-voltage plasma tube having X-axis electrodes and Y-axis electrodes on the respective two sides of an evacuated region provided with neon gas. A neon light is created at the respective junction of a driven X-axis and Y-axis electrode pair. A suitable plasma display tube having 512 X-directional electrodes and 512 Y-directional electrodes sandwiching a neon gas and having a total light-emitting surface of approximately 8.5×8.5 inches is a Digivue ®-512 plasma discharge tube, manufactured by Owems Illinois of Ohio. The maximum switching rate of such a plasma tube is 50 kHz. The tube is refreshed every 33 microseconds. In order to create a small neon light at the intersection of the driven electrodes, the minimum discharge voltage difference between the respective two electrodes is 250 volts. It is thus seen that by properly addressing both X and Y directional electrodes with the two-dimensional Walsh functions generator 10, two-dimensional Walsh function light patterns of order up to 512×512 can be generated in any sequence.

It is seen that the control signals provided by the Walsh function generator 10 are not in either proper format or capable of providing the high voltage differential necessary to drive the plasma discharge device 18 properly. As stated above, the exclusive OR gates of FIG. 4 generate 64 X-axis driving signals.

In order to provide the desired high-voltage differential required to drive the plasma discharge device 18, the output from each respective exclusive OR gate is used to control a high voltage driver transistor circuit of the type shown within dashed-line box 402. A driver 402 is used for each of the driver boxes shown within the dashed-line box 404, to produce the high voltage driving signals present at the outputs in dashed-line box 406.

Referring now to the driver shown in dashed-line box 402 of FIG. 4, is seen that the driver is a sourcing and sinking type switch circuit. The current is sourced through transistor 410 and 412, and is sunk through transistors 414 and 416. A high voltage NPN switching transistor, such as a Motorola MPSA 42, is suitable for each of the transistors 410, 412, 414 and 416.

The requirement of driver 402 is that the sourcing and sinking halves of the circuit must never be ON at the same time. Such a simultaneous ON condition which exists for any appreciable amount of time will cause circuit overheating. Capacitor 418 connected between the emitter of transistor 414 and electrical ground delays the base-to-emitter junction of transistor 414 from reaching 0.7 volts D.C. and thereby turning transistor 416 ON. This operation ensures that transistors 410 and 412 will be OFF by the time the transistor Q4 goes to the ON state.

In the other direction of operation, when transistor 414 is going OFF and the input drops to between 1.4 and 0.7 volts D.C., transistor 414 is still ON and acting like an emitter-follower and transistor 410 is still OFF but transistor 416 has already gone OFF. This eliminates the problem associated with the two halves of the circuit being ON at the same time. The rise and fall times of the circuits are between 3 and 4 microseconds, which has been found to be adequate to achieve the desired operation. The Darlington configuration of the four transistors is used for current gain. It has been found that there is approximately 0.6 volts D.C. noise immunity between transistor 416 $V_{be}+$ transistor 414 $V_{ce}$ and transistor 410 $V_{be}+$ transistor 412 $V_{be}$. This level has been found adequate for system noise immunity because the output of the exclusive OR gate changes from 0 volts to +3.5 volts D.C.

As stated above, the plasma discharge device 18 can be viewed as a tube containing a plurality of separately operatable neon lights, one of which existing at each X and Y electrode intersection. Electrically, the plasma display tube is a capacitor, i.e., there is a dielectric covering the X and Y electrodes, as is well known in the art. This means that the plasma discharge device 18 must be refreshed or run dynamically. Device 18 in the present embodiment is refreshed at 32 kHz. rate. The firing voltage on the tube is approximately 250 volts D.C. Such a firing is accomplished by switching the intersecting electrodes to opposite polarities by 125 volts each. In other words, one electrode goes down 125 volts D.C., while the other electrode goes up 125 volts D.C. thereby causing the capacitive plasma tube to see a 250 volt D.C. change between its capacitive characteristic. In this way, the plasma discharge device 18 can display any desired Walsh function light pattern.

It should be understood that display device 18 produces the Walsh function light patterns in the visible light range, but that the present invention is not so limited, and display device 18, can produce such patterns in the infrared or ultraviolet spectrums.

Figure 6:
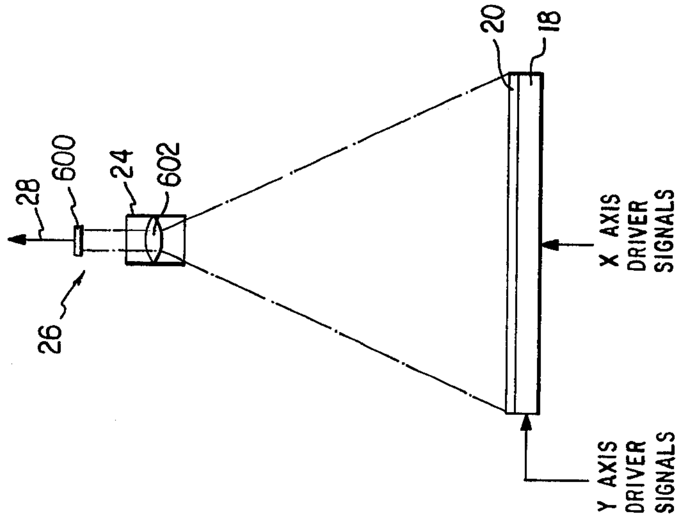
FIG. 6 shows a side view of the relationship between the plasma discharge device 18, phototransparency 20, optical system 24 and light sensor 26 of FIG. 1.

FIG. 6 shows in block diagram form the optical path and light sensing arrangement of the present invention, wherein the image is illuminated by the Walsh function display pattern to produce a masked pattern, which is provided by an optical system 24 and integrated by a sensor 26 to provide an output signal indicative of the total light of the masked pattern.

Referring to FIG. 6, which shows the optical path and light sensing from a side perspective, it is seen that the optical path is straightforward. The plasma discharge device 18 has the phototransparency 20 disposed on its surface that provides the Walsh function light pattern. Image 20 in the example shown is a phototransparency comprising a negative of the image to be analyzed. Such phototransparency, for example, can be provided by a high altitude camera. It should be understood that image 20 can take any form capable of being illuminated by the generated Walsh function light pattern so as to produce the masked pattern. Thus, image 20 is not limited to the phototransparency that is shown.

The masked pattern, which is the product of the Walsh function light pattern multiplied by the image of the phototransparency 20, is focused on the entire photosensitive area 600 of the light sensor 26 by the optical system 24. In the configuration shown, the optical system 24 comprises a single concave lens mounted one focal length away from and centered over the plasma discharge device 18. The photosensitive area 600 is disposed above lens 602 so as to receive the concentrated light pattern over its entire sensor area 600. It is thus seen that the sensor 26 acts to integrate all of the light passing through the image from the Walsh function light pattern. The intensity of this light from the masked pattern is effectively used to produce a Walsh transform coefficient for each Walsh function light mask.

It should be understood that the optical system 24 of the present invention can employ any optical lens arrangement which will provide the masked image to the light sensor 26. Thus, the present invention is not limited to the single lens approach shown in FIG. 6.

Figure 7:
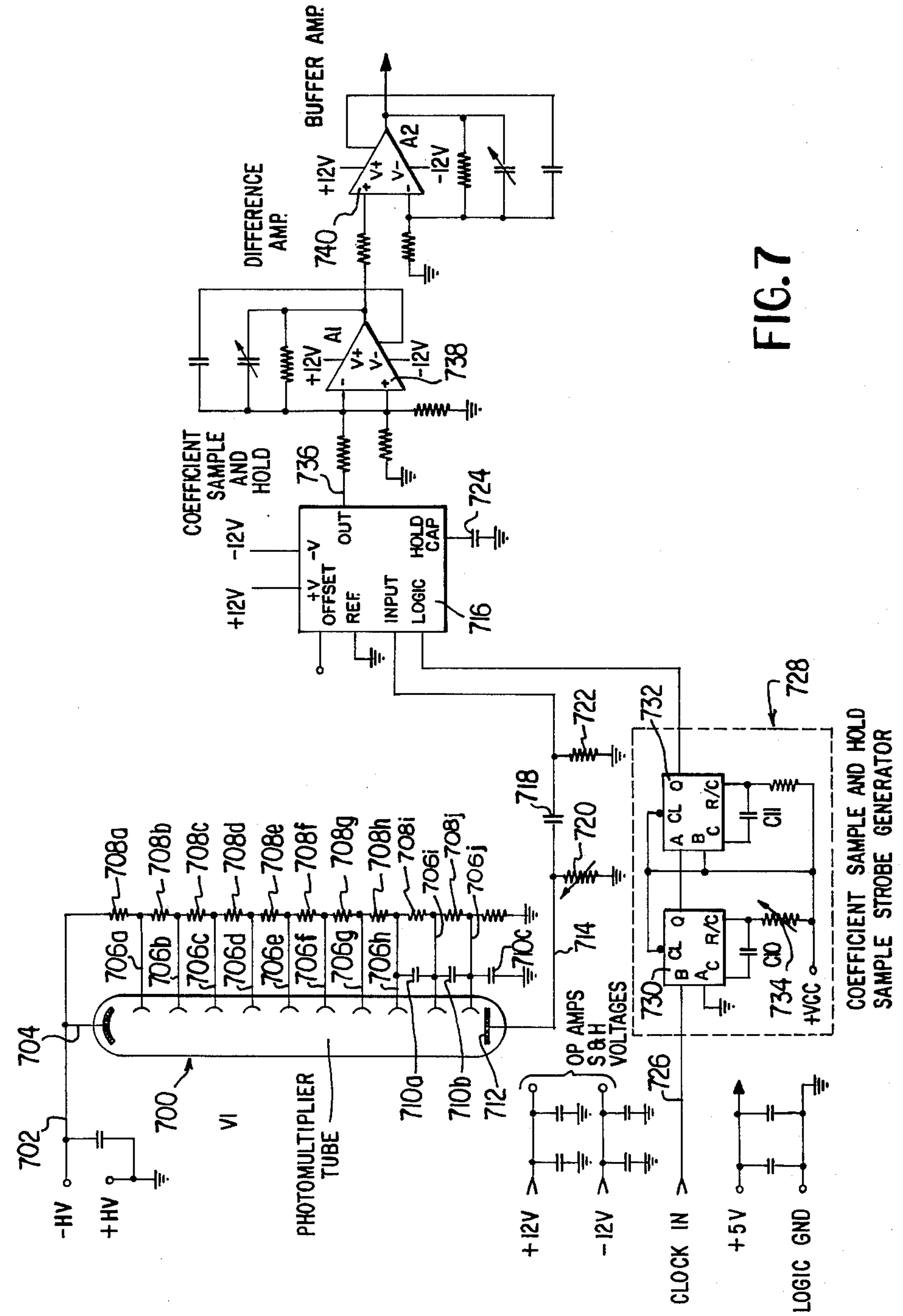
FIG. 7 shows a schematic diagram of the light sensor 26 and a portion of the coefficient processor 30 of FIG. 1.

FIG. 7 shows a schematic diagram of the electronics of the sensor 26 and a portion of the coefficient processor 30 of FIG. 1. Referring now to FIG. 7, it is seen that a photomultiplier tube 700 constitutes the light sensor 26. As stated above, the photomultiplier tube 700 integrates the light passing through the image from the Walsh function light pattern. Photomultiplier tube 700 is of conventional design.

Supply voltage for the photomultiplier tubes 700 is provided by a conventional high voltage supply (not shown) via a line 702. While cathode 704 of the photomultiplier tube 700 is maintained at a high negative D.C. potential present on line 702, the photon acceleration elements 706A–706J are supplied through taps on a high resistance resistor chain made up of resistors 708A–708K. Capacitors 710A, 710B and 710C are used to hold constant the voltage on the acceleration elements when a pulsed light input is present.

The output signal from photomultiplier tube 700 is supplied by an anode 712 which is connected to an output line 714. The level of the output signal on line 714 is representative of the integral of the light from the masked light pattern which is focused on the photomultiplier tube 700. The output signal on line 714, which is an analog signal that goes negative as the light intensity on the photomultiplier tube increases, is supplied to the input 3 of a coefficient sample and hold circuit 716 via a capacitor 718 and a variable resistor 720 connected to electrical ground and a resistor 22 connected to electrical ground, as shown in FIG. 7. The coefficient sample and hold circuit is of conventional design and can be a Model LF 398. The reference input terminal 7 is connected to electrical ground, and a capacitor 724 is connected from the hold cap terminal 6 to electrical ground.

The coefficient sample and hold circuit 716 is enabled by a clock input strobe signal effectively from interconnection P28 of FIG. 3. As shown in FIG. 7, this clock input signal from interconnection P28 is supplied via a line 726 to a coefficient sample and hold sample strobe generator contained within dashed-line box 728. Specifically, the coefficient sample and hold sample strobe generator 728 includes a special sampling one shot circuit 730, and a second special sampling one shot circuit 732, which are connected electrically so that they produce a Walsh coefficient sample and hold pulse that occurs exactly coincident with the maximum Walsh coefficient signal. Specifically, one shot circuit 730 is triggered by the positive edge of the system clock 302, and a variable resistor 734 is used to adjust the width of the output pulse from the one shot circuit 730 within a preselected time delay range, such as 3–40 microseconds. The negative going edge of the output Q on pin 13 of one shot 730 is used to trigger the pulse from the one shot 732, whereby enabling the operator to adjust the position of this narrow, for example, 4 microseconds, sampling pulse along the whole clock cycle by adjusting the value of the variable resistor 734.

When the sampling pulse is provided to the logic input at pin 8 of the coefficient sample and hold circuit 716 by the coefficient sample and hold sample strobe generator 728, the coefficient sample and hold circuit 716 samples and holds the amplitude level of the output signal on line 714 until the next sampling pulse is provided by the output of the one shot circuit 732.

It is thus seen that because of the generation of the sampling pulse from generator 728, the coefficient sample and hold circuit 716 samples and holds the output signal on line 714 which occurs substantially at its highest negative amplitude level.

The signal present at the output of the coefficient sample and hold circuit 716 is thus indicative of the highest amplitude level of the signal on line 714 that has been sampled and held. The output signal from the output of the coefficient sample and hold circuit 716 can be digitized and then provided to the minicomputer 34. However, it has been found that it is desirable to provide buffering of the output signal from the coefficient sample and hold circuit 716 prior to providing it to the analog to digital converter, discussed below. Specifically, the output signal at the output of the coefficient sample and hold stage 716 is provided via a line 736 to the inverting input of a difference amplifier 738 connected to provide a 1:1 grain and thus act as an inverting buffer amplifier. The difference amplifier 738 is of conventional design, and a LM 301 by Motorola has been found to be suitable.

The output signal on terminal 6 of the buffer amplifier 738 is an inverted version of its output signal on line 736. This positive going analog signal is provided to the noninverting input of a difference amplifier 740, connected to produce a 2:1 gain and thus also act as a buffer amplifier. The output of amplifier 740, which is a positive going signal having twice the absolute amplitude of the signal present on line 736, is effectively provided to the input of an analog to digital converter, which is shown in FIG. 8.

Figure 8:
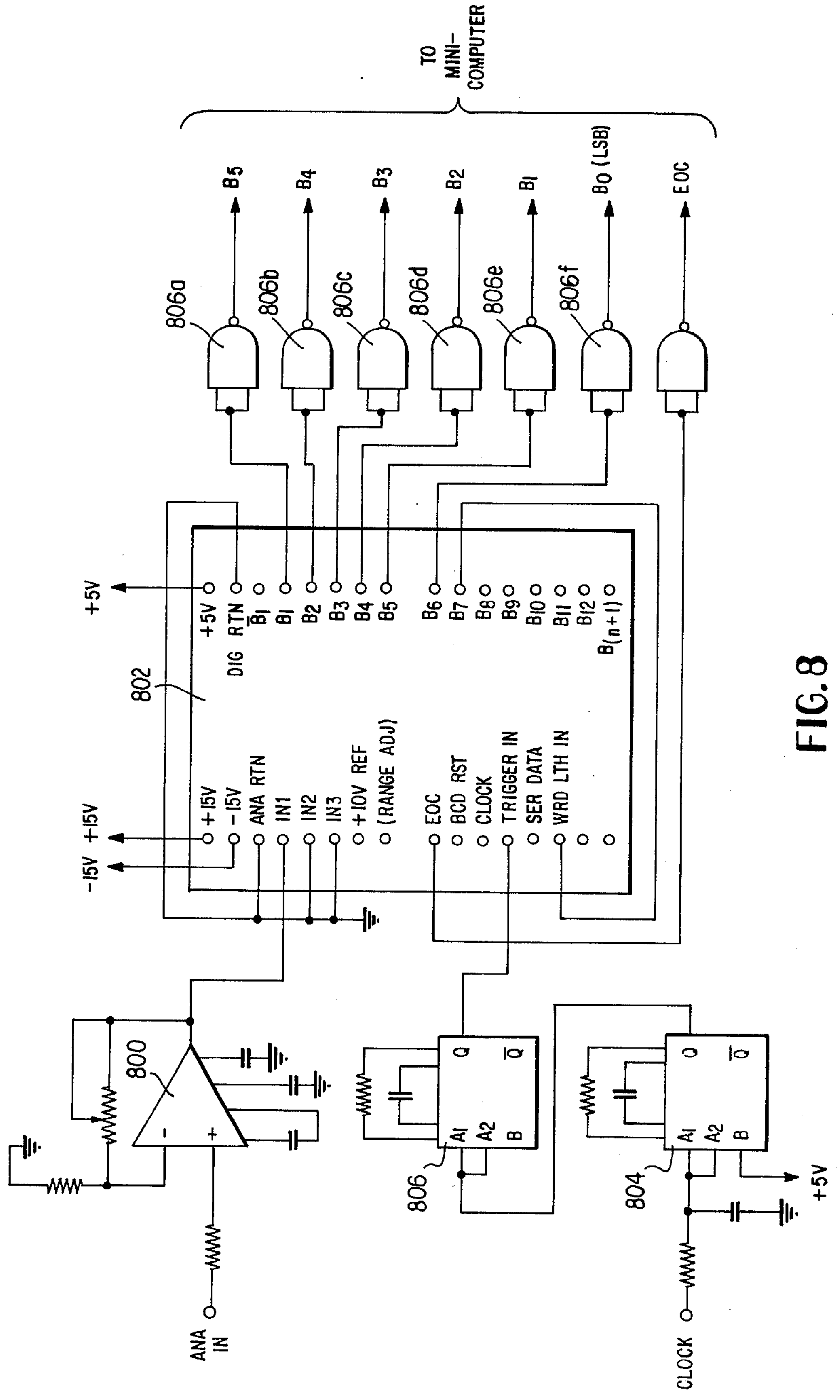
FIG. 8 shows a schematic diagram of the interface electronics of the coefficient processor 30 of FIG. 1.

The interface electronics in the coefficient processor 32 for converting the analog output signal from buffer amplifier 740 into a corresponding digital signal is shown in FIG. 8. The circuit of FIG. 8 provides a 6-bit digital signal having a value which corresponds to the amplitude level of the analog signal provided at the output of the buffer amplifier 740.

Specifically, the positive going output analog signal from buffer amplifier 740 is provided to the noninverting input of an operational amplifier 800. Operational amplifier 800 is connected to provide an output signal on its terminal 11 proportional to the input analog signal on its noninverting input 5. Typically, the gain of amplifier 800 is said to be between 1 and 2, and a MA715 operational amplifier of conventional design has been found to be satisfactory.

The positive going output analog signal is provided to the input of an analog to digital converter 802. The analog to digital converter 802 can be of any conventional design which provides a desired digital signal at its output which corresponds to its input analog signal. For example, a Model MP2172C analog to digital converter made has been found to be satisfactory, and is shown in FIG. 8.

The square wave clock signal from the system clock 302 of FIG. 3 is shaped and delayed by two monomultivibrators 804 and 806, respectively, and then used as a trigger input to the analog to digital converter 802. A suitable monomultivibrator is a Model 74121 by Texas Instruments.

The 6-bit digital signal representative of the analog signal present at the output of the operational amplifier 800 is provided by outputs $B_1$ to $B_6$ of the analog to digital converter 802. An end of conversion (EOC) output is also provided to the minicomputer 34 by the EOC output of the analog to digital converter 802. Each of the output signals from outputs $B_1$-$B_6$ of the analog to digital converter 802 are provided to a respective NAND gates 806A-806F which act as line drivers, as shown in FIG. 8. The NAND gates can be of any conventional type, such as a Model 7437 by Texas Instruments. The digital signal at the output of the NAND buffers 806A-806F is supplied in parallel fashion via the six line bus 32 to the corresponding input ports of the minicomputer 34.

Any suitable minicomputer can be employed as minicomputer 34, as well as custom integrated circuits or gate array processors. A suitable example for the minicomputer 34 is a HP2108 manufactured by Hewlett-Packard of Palo Alto, Calif.

The minicomputer 34 along with its associated input terminal 36, cathode ray tube display 40 and line printer 44 are used to provide quantative measurement and display of the relative magnitude of the Walsh transform coefficients for each of the masked patterns. In addition, minicomputer 34 is used also to control and initiate the system of the present invention when it is operated in the automatic running mode.

The appendix on pages 64 and 65 of ETL-0204 incorporated by reference herein shows a representative program listing of software developed to operate the minicomputer 34 under stored program control so as to provide the desired quantitative measurement and display of the relative magnitudes of the Walsh coefficients, and also to control and initiate the system when it is operated in the automatic running mode.

The software of the appendix on pages 64 and 65 of ETL-0204 effectively causes the minicomputer 34 to perform the following functions: (1) input the first $64\times 64$ lower order Walsh coefficients into the memory of the minicomputer 34; (2) compute the lowest coefficient A (0,0) as twice the average of all of the coefficients; (3) scale the coefficients into the range of 0 to 99; (4) compute the actual coefficients by subtracting one-half A(0,0) for each coefficient; (5) pass the coefficients through a variable valued threshold gate; (6) provide repeated X and Y scanning signals to the CRT monitor and display the absolute value of the Walsh coefficients after the threshold operation has been accomplished; and (7) scale the Walsh coefficients for display either by the CRT display 40 or by the line printer 44.

The reason that the Walsh coefficients are scaled so as to provide positive or negative values from positive 99 to negative 49 as opposed to only positive values from 0–99 is because the Walsh function mathematically is binary and is either in the $+1$ or $-1$ state. By scaling the Walsh coefficients so that they have either positive or negative values, the present invention produces Walsh coefficients at its output which are representative of the positive or negative states that the Walsh coefficient mathematically exhibits. This normalization allows analysis of desired topographic features which could not be as effectively provided if the Walsh coefficients were not scaled in this way. The usefulness of this transformation in the Walsh coefficients will become more apparent when the examples presented below are discussed.

Figure 9A:
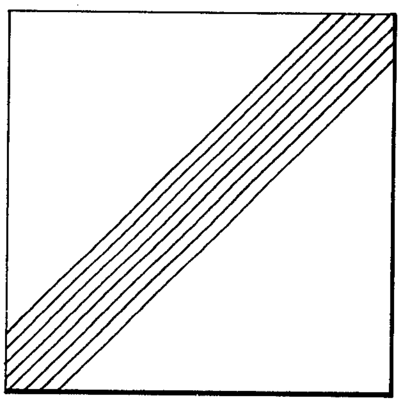
FIG. 9A shows an image representing a diagonally oriented line road which extends from the bottom lefthand corner to the top righthand corner, where the shaded regions of the image are transparent and where the unshaded regions are opaque.
Figure 9B:
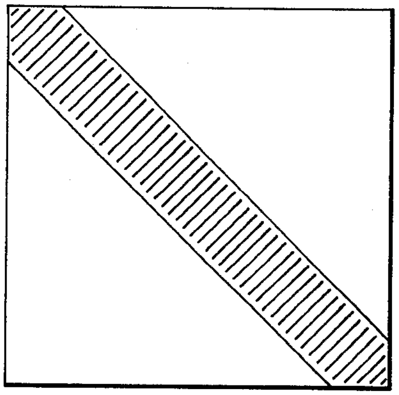
FIG. 9B shows an image representative of a diagonally oriented line road which extends from the top lefthand corner to the bottom righthand corner of the transparency, where the shaded regions of the image are transparent and where the unshaded regions are opaque.

The operation of the method and apparatus of the present invention to analyze the images of FIGS. 9A and 9B is now described. FIG. 9A represents an image showing a diagonally oriented line road which extends from the lower lefthand corner of the transparency to its upper righthand corner. In contrast, FIG. 9B represents an image showing a diagonally oriented line road which extends from the top lefthand corner to the bottom righthand corner of the transparency.

These two images are some of a selected set of targets representing manmade topographical features, such as road intersections, straight line roads, and buildings, which were used to test and evaluate the present invention.

The image of FIG. 9A was placed in direct contact with the light emitting surface of the plasma discharge device 18 and the system was operated in the automatic mode to produce only the first $32\times 32$ lower order Walsh coefficients. While the system of the present invention can produce at maximum $512\times 512$ Walsh coefficients for each image or transparency 20 being analyzed, the inventors have discovered that the significant spectral components are distributed among a few of the lower order Walsh coefficients for all of the targets evaluated. This is why only the first $32\times 32$ lower order Walsh coefficients were produced by the system of the present invention in these tests.

Table 1 below lists the first $32\times 32$ unfiltered lower order Walsh coefficients for the image of FIG. 9A.

TABLE 1

WAL3 COEFFICIENTS

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1 | 60 | 2 | 8 | 0 | -12 | 0 | 6 | -8 | 0 | -2 | 2 | -2 | -4 | -2 | 4 | -6 | 0 | -2 | 0 | -6 | -6 | -4 | -4 | 0 | 0 | -6 | 0 | 0 | 0 | 0 | 0 | 0 |
| 2 | 4 | -56 | -6 | 0 | -4 | 16 | 0 | -4 | -2 | -4 | 0 | -6 | -2 | 0 | 0 | -8 | -4 | -6 | -2 | -10 | -6 | -6 | -6 | -6 | -4 | -8 | -6 | -6 | -4 | -4 | -6 | -6 |
| 3 | 26 | 2 | 40 | 4 | 4 | 0 | 14 | 0 | 0 | -2 | -4 | 0 | 2 | -2 | 8 | 0 | 2 | 0 | 0 | -2 | -4 | 0 | -2 | -4 | -2 | -2 | -2 | -4 | 2 | 2 | 6 | 0 |
| 4 | 12 | 8 | 4 | -16 | 4 | 12 | 2 | 0 | 6 | 6 | 4 | 10 | 4 | 4 | 2 | 0 | 4 | 4 | 2 | 2 | -2 | 0 | 0 | 0 | 0 | 2 | 2 | 4 | 0 | 4 | 0 | 0 |
| 5 | 4 | 8 | 12 | 4 | 22 | 4 | 6 | 2 | 2 | 0 | 4 | 4 | 12 | 0 | 6 | 0 | 2 | 2 | 2 | -2 | -4 | 0 | 0 | -2 | -2 | -2 | 0 | 0 | 2 | 0 | 0 | 0 |
| 6 | 12 | 26 | 10 | 10 | 2 | -6 | 2 | 6 | 4 | 4 | 2 | 6 | 4 | -4 | 0 | 0 | 2 | 2 | 0 | 0 | -2 | 0 | -2 | -2 | -2 | -2 | 0 | 0 | 0 | 0 | -2 | 2 |
| 7 | 18 | 4 | 22 | 8 | 6 | 6 | 6 | 2 | 4 | 6 | 4 | 2 | 4 | 2 | 6 | 0 | 2 | 0 | 4 | 0 | -2 | 2 | 2 | 0 | 0 | 0 | 0 | -2 | 2 | 2 | 2 | 0 |
| 8 | 12 | 12 | 2 | 2 | 0 | 10 | 4 | 8 | 0 | 2 | 8 | 4 | 4 | 4 | 6 | 0 | 6 | 2 | 2 | 0 | 0 | 0 | 2 | -2 | 0 | -2 | 4 | 2 | 2 | 4 | 0 | 0 |
| 9 | 12 | 8 | 4 | 6 | 2 | 2 | 2 | 4 | -6 | 4 | 4 | 4 | 4 | 2 | 4 | 0 | 4 | 4 | 4 | 2 | 0 | 4 | 0 | 0 | -4 | 2 | 0 | 4 | 2 | 6 | 2 | 4 |
| 10 | 10 | 6 | 8 | 6 | 6 | 4 | 0 | 4 | 2 | 8 | 6 | 0 | 2 | 2 | 6 | 0 | 2 | 4 | 4 | 2 | -2 | 2 | 4 | 2 | 2 | 4 | 4 | 2 | 4 | 4 | 4 | 4 |
| 11 | 8 | 6 | 0 | 8 | 2 | 6 | 2 | 0 | 0 | 2 | 4 | 2 | 2 | 2 | 2 | 2 | 4 | 2 | 2 | 0 | 2 | 0 | 0 | 2 | 0 | 0 | 2 | 0 | 2 | 4 | 2 | 4 |
| 12 | 10 | 10 | 4 | 12 | -2 | 2 | 6 | 0 | 4 | 2 | 4 | 2 | 4 | 0 | 2 | 0 | 4 | 0 | 4 | 0 | 0 | 0 | 0 | 0 | 0 | 0 | 2 | 0 | 2 | 4 | 0 | 4 |
| 13 | 6 | 4 | 8 | 2 | 8 | 4 | 2 | 0 | 4 | 2 | 2 | 0 | 4 | 2 | 4 | 0 | 0 | 0 | 2 | 0 | -2 | 0 | 0 | 0 | 0 | 0 | 0 | 0 | 2 | 2 | 2 | 0 |
| 14 | 8 | 8 | 4 | 2 | 0 | -4 | 0 | -2 | -2 | -4 | 2 | -2 | 0 | -2 | 0 | -4 | 0 | 2 | -4 | -2 | -4 | -4 | -2 | -2 | -4 | -4 | -2 | -4 | 0 | 0 | -2 | -2 |
| 15 | 10 | -2 | 8 | 2 | -2 | 2 | 2 | -4 | -4 | -2 | -4 | 0 | 0 | -2 | 2 | -4 | -2 | -2 | 0 | -6 | -4 | -6 | -2 | -4 | -4 | -6 | -4 | -4 | 0 | 0 | -2 | -2 |
| 16 | 8 | 0 | -4 | 0 | -6 | 0 | -2 | -6 | -2 | -4 | -4 | -4 | -4 | -8 | -2 | -10 | -4 | -4 | -2 | -8 | -8 | -6 | -6 | -6 | -6 | -6 | -6 | -6 | -6 | -4 | -6 | -6 |
| 17 | 10 | 4 | 4 | 4 | 0 | 2 | 2 | -2 | 2 | 0 | 4 | 0 | 2 | 0 | 4 | 0 | 4 | 0 | 2 | 0 | -2 | 0 | 0 | -2 | 0 | 0 | 0 | -2 | 0 | 2 | 0 | 0 |
| 18 | 8 | 2 | 4 | 4 | 0 | 2 | 0 | -2 | 2 | 2 | 2 | 2 | 0 | 2 | -2 | -2 | 2 | -2 | 0 | 0 | -2 | -2 | -2 | -2 | -2 | -2 | 0 | 0 | -2 | 0 | 0 | 0 |
| 19 | 6 | 2 | 0 | 2 | 0 | 0 | -4 | -2 | 0 | 2 | 0 | 0 | 2 | 0 | 2 | -2 | 0 | 2 | 2 | -2 | -4 | 0 | 0 | -2 | 0 | -2 | 0 | 0 | -2 | 2 | 0 | -2 |
| 20 | 6 | 4 | 0 | 4 | 0 | 0 | 0 | -2 | 0 | 0 | 2 | 0 | 0 | 0 | 2 | 0 | 0 | 0 | 2 | 0 | -2 | 0 | 0 | 0 | 0 | 2 | 0 | 0 | 0 | 2 | 0 | 2 |
| 21 | 6 | -2 | -2 | -4 | -8 | -4 | -2 | -6 | -4 | -4 | -4 | -4 | -4 | -4 | -2 | -6 | -4 | -4 | -4 | -6 | -8 | -4 | -2 | -4 | -6 | -6 | -4 | -4 | -4 | -2 | -2 | -4 |
| 22 | 6 | -4 | -4 | -2 | -6 | -4 | -4 | -8 | -6 | -6 | -4 | -4 | -6 | -6 | -4 | -8 | -4 | -4 | -6 | -6 | -8 | -6 | -6 | -8 | -6 | -6 | -4 | -8 | -4 | -4 | -4 | -6 |
| 23 | 4 | -4 | -2 | -2 | -6 | -2 | -4 | -6 | -6 | -6 | -4 | -4 | -4 | -4 | -2 | -8 | -4 | -6 | -4 | -10 | -8 | -8 | -8 | -6 | -6 | -6 | -6 | -4 | -6 | -4 | -6 | -6 |
| 24 | 6 | -2 | -4 | -2 | -6 | -6 | -4 | -10 | -4 | -6 | -6 | -6 | -6 | -6 | -4 | -8 | -6 | -6 | -4 | -8 | -10 | -8 | -8 | -6 | -8 | -8 | -8 | -8 | -8 | -6 | -8 | -6 |
| 25 | 8 | 2 | 2 | 2 | 0 | 0 | -2 | 0 | -4 | 0 | 2 | 0 | 2 | -2 | 0 | -2 | -2 | 0 | 0 | -4 | -4 | -4 | -4 | -2 | -4 | -2 | -2 | -2 | -2 | -2 | -4 | -2 |
| 26 | 8 | 2 | 2 | 2 | -2 | -2 | -2 | -4 | -4 | 0 | -2 | -4 | -2 | -4 | -2 | -4 | -2 | -2 | -2 | -6 | -6 | -6 | -2 | -6 | -6 | -6 | -4 | -4 | -4 | -4 | -4 | -2 |
| 27 | 6 | 4 | 0 | 4 | 2 | 4 | 2 | -2 | 0 | 0 | 2 | 0 | 4 | 0 | 2 | -2 | 2 | 0 | 0 | -2 | -4 | 0 | -2 | 0 | -2 | 0 | 0 | 0 | -2 | 0 | 0 | -2 |
| 28 | 8 | 6 | 2 | 6 | -2 | 0 | 2 | -2 | 0 | -2 | 0 | 0 | 0 | -2 | 0 | -2 | 0 | -2 | -2 | -4 | -4 | -2 | -4 | -2 | -4 | -4 | -2 | -4 | -2 | 0 | -4 | -2 |
| 29 | 6 | 2 | 4 | 2 | 2 | 2 | 0 | -2 | 0 | 0 | 0 | 0 | 0 | -2 | 0 | -2 | -2 | 0 | 0 | -2 | -4 | -4 | -4 | -2 | -2 | -4 | 0 | -2 | 0 | -2 | -2 | -2 |
| 30 | 8 | 6 | 2 | 2 | -2 | -2 | -2 | -4 | -2 | -2 | 0 | -2 | 0 | -4 | -2 | -4 | 0 | -2 | -2 | -4 | -6 | -4 | -4 | -4 | -4 | -6 | -2 | -4 | -4 | 0 | -4 | -2 |
| 31 | 8 | 2 | 6 | 4 | 0 | 4 | 2 | 0 | 0 | 0 | 2 | 0 | 2 | 0 | 2 | -2 | 2 | 0 | 2 | -2 | -4 | -4 | -2 | -2 | -2 | -2 | 0 | -2 | 0 | 2 | 0 | 0 |
| 32 | 10 | 4 | 2 | 0 | -2 | 0 | 0 | -6 | -2 | -2 | 0 | -2 | -2 | -4 | -2 | -4 | -2 | -2 | -4 | -4 | -6 | -4 | -4 | -6 | -4 | -4 | -2 | -2 | -4 | 0 | -2 | -4 |

Table 2 is a matrix listing the first 32×32 filtered lower order Walsh coefficients of the image of FIG. 9A. The less significant Walsh coefficients have been filtered out of the matrix so as to leave only those Walsh coefficients which are greater in an absolute value sense than the filter value selected. It is seen that only three Walsh coefficients have an absolute value which is greater than the filter level. (It should be noted that coefficients (2,2) and (3,3) of Tables 1 and 2 are slightly different due to experimental error because Tables 1 and 2 were generated at different time and some coefficients were partially corrupted by system noise.

TABLE 2

| | \multicolumn{32}{c}{WAL3 COEFFICIENTS} |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| 1 | 60 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | -54 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 36 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 21 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 23 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 26 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 27 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 28 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 29 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 32 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Table 3 lists the first 32×32 unfiltered lower order Walsh coefficients for the image of FIG. 9B.

TABLE 3

| | WAL5 COEFFICIENTS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| 1 | 60 | 0 | 22 | 12 | -12 | 0 | 8 | -6 | 2 | -2 | 2 | 0 | -2 | -2 | 4 | -4 | 2 | 0 | 2 | -4 | -6 | -2 | -2 | 0 | 0 | -6 | 0 | 0 | 0 | 2 | 2 | 0 |
| 2 | 16 | 56 | 12 | 6 | 2 | -16 | 0 | -6 | 2 | 0 | 2 | 0 | 2 | -8 | 2 | 0 | 2 | 4 | 0 | 0 | -6 | 0 | -2 | 0 | -6 | -2 | 0 | 0 | .0 | 2 | 0 | 0 |
| 3 | 24 | -8 | 38 | 4 | 6 | 6 | 16 | -2 | 0 | 0 | 0 | 0 | 4 | 2 | 8 | -2 | 0 | 0 | 0 | -4 | -4 | -2 | 0 | -2 | 0 | 0 | 0 | 0 | 0 | 0 | 6 | 0 |
| 4 | 8 | 4 | 10 | 34 | 8 | 2 | 8 | 6 | 6 | 0 | 6 | -4 | 6 | 2 | 4 | 2 | 4 | 2 | 4 | 0 | 0 | 0 | 2 | 0 | 4 | -2 | 2 | 0 | 6 | 2 | 6 | 4 |
| 5 | 2 | 0 | 8 | 2 | 20 | 4 | 6 | 0 | 4 | 4 | 4 | 2 | 10 | 2 | 4 | -2 | 2 | 0 | 2 | 0 | -4 | -2 | 0 | 0 | 0 | 0 | 0 | 0 | 2 | 0 | 0 | 0 |
| 6 | 12 | -16 | 0 | 2 | 2 | 18 | 2 | -6 | 2 | 0 | 2 | 0 | 2 | 4 | 2 | -2 | 0 | 2 | 2 | -2 | -2 | -2 | -2 | 0 | 0 | -4 | -2 | -2 | -2 | -2 | -2 | -2 |
| 7 | 20 | 2 | 22 | 8 | 4 | 4 | 8 | 2 | 6 | -2 | 6 | 6 | 6 | 2 | 6 | 0 | 4 | 4 | 2 | 0 | 0 | 0 | -2 | 0 | 0 | -2 | 0 | 0 | 0 | 2 | 2 | 0 |
| 8 | 12 | -4 | 6 | 14 | 2 | 2 | 6 | -2 | -2 | 4 | 6 | 4 | 4 | 4 | 4 | 2 | 6 | 6 | 4 | 0 | 0 | 4 | 2 | 2 | -2 | 0 | 2 | 0 | 2 | 0 | 2 | 2 |
| 9 | 14 | 0 | 4 | 8 | 0 | 10 | 2 | 4 | -6 | 2 | 4 | 2 | 6 | 2 | 4 | 2 | 6 | 2 | 6 | 0 | 2 | 0 | 2 | 2 | 0 | 0 | 4 | 0 | 6 | 4 | 4 | 2 |
| 10 | 8 | 2 | 6 | 8 | 4 | 6 | 4 | 2 | 4 | -2 | 6 | 8 | 4 | 6 | 6 | 2 | 6 | 4 | 6 | 2 | 0 | 4 | 2 | 4 | 2 | 0 | 4 | 6 | 4 | 6 | 4 | 6 |
| 11 | 8 | 2 | 0 | 6 | 2 | 4 | 2 | 4 | 2 | 4 | 2 | 2 | 2 | 4 | 0 | 0 | 2 | 2 | 4 | 0 | -2 | 2 | 0 | 0 | 2 | 2 | 2 | 4 | 2 | 4 | 4 | 4 |
| 12 | 12 | -2 | 2 | 0 | -2 | 4 | 4 | 0 | 4 | 4 | 2 | 4 | 4 | 2 | 2 | -2 | 2 | 2 | 2 | 0 | 0 | 0 | -2 | 0 | 4 | 2 | 0 | 0 | 2 | 4 | 2 | 0 |
| 13 | 6 | 2 | 6 | 6 | 8 | 6 | 4 | 2 | 2 | 2 | 2 | 2 | 6 | 2 | 4 | 0 | 2 | 4 | 6 | -4 | 0 | 0 | 0 | 0 | 0 | -2 | 2 | 4 | 6 | 4 | 2 | 2 |
| 14 | 8 | -8 | 0 | 4 | -2 | 6 | -2 | -2 | -2 | -2 | 2 | -2 | 0 | 0 | 2 | -4 | 2 | -4 | -2 | -6 | -4 | -4 | -2 | -4 | -4 | -4 | 0 | -4 | -4 | 0 | -2 | -4 |
| 15 | 10 | 2 | 8 | 2 | 0 | 0 | 2 | -2 | 0 | -2 | -2 | -2 | 0 | -6 | -2 | -6 | 0 | -2 | 0 | -2 | -6 | -4 | -4 | -4 | -2 | -4 | -4 | -2 | -2 | -2 | 0 | -2 |
| 16 | 8 | -6 | 0 | 2 | -6 | -2 | -2 | -6 | -4 | -2 | -4 | -6 | -4 | -4 | -2 | -6 | -2 | -4 | 0 | -6 | -8 | -6 | -6 | -6 | -4 | -6 | -4 | -6 | -4 | -6 | -4 | -4 |
| 17 | 10 | 8 | 4 | 6 | 2 | 4 | 2 | 0 | 2 | 0 | 2 | 2 | 0 | 4 | 2 | -6 | 2 | 2 | 2 | -2 | -2 | 0 | 0 | -2 | 0 | -2 | 0 | 0 | 2 | 2 | 0 | 0 |
| 18 | 8 | 2 | 4 | 6 | -2 | 4 | 2 | 0 | 0 | 0 | 6 | 0 | 4 | -2 | 0 | 0 | 2 | 2 | 0 | -4 | -2 | -2 | -2 | 0 | -2 | -2 | 2 | 0 | 0 | 0 | 0 | 0 |
| 19 | 6 | 0 | 0 | 2 | 0 | 4 | 0 | -2 | 2 | 0 | 2 | -2 | 2 | -4 | 2 | -2 | 2 | 0 | 2 | -2 | -4 | 0 | 0 | -2 | -2 | -4 | 0 | -2 | -2 | 0 | 0 | 0 |
| 20 | 6 | 0 | 0 | 4 | 0 | 2 | 0 | 0 | 0 | 2 | 4 | 2 | 2 | 2 | 4 | 0 | 2 | 2 | 2 | 0 | -4 | 0 | -2 | 0 | 0 | 0 | 0 | 0 | 2 | 2 | 0 | 2 |
| 21 | -6 | -4 | -2 | 2 | -6 | 0 | -2 | -6 | -2 | -6 | -2 | 0 | -4 | -4 | -4 | -6 | -4 | 0 | -2 | -4 | -6 | -4 | -4 | -4 | -4 | -4 | -2 | -4 | -4 | -4 | -2 | -2 |
| 22 | 4 | 0 | 0 | 2 | -6 | -4 | -6 | -2 | -6 | -2 | 0 | -4 | -4 | -6 | -4 | -8 | -2 | -4 | -2 | -8 | -8 | -6 | -4 | -6 | -4 | -6 | -4 | -4 | -4 | -2 | -4 | -2 |
| 23 | 2 | -2 | -2 | 2 | -4 | -2 | -4 | -6 | -4 | -4 | -4 | -4 | -4 | -8 | -4 | -8 | -4 | -4 | -2 | -6 | -6 | -6 | -6 | -6 | -4 | -6 | -6 | -6 | -4 | -4 | -6 | -4 |
| 24 | 6 | 0 | -2 | 2 | -6 | -2 | -6 | -6 | -2 | -6 | -4 | -8 | -6 | -6 | -4 | -8 | -6 | -6 | -4 | -8 | -8 | -8 | -8 | -8 | -8 | -8 | -6 | -6 | -6 | -6 | -4 | -6 |
| 25 | 10 | 0 | 2 | 6 | 2 | 2 | 2 | 0 | -4 | 0 | 2 | 0 | 0 | -2 | 0 | -2 | 0 | 0 | -2 | -4 | -4 | -4 | -2 | -6 | -4 | -4 | -2 | -2 | 0 | 0 | -2 | -2 |
| 26 | 6 | -2 | 0 | 0 | -4 | 0 | -2 | -4 | -2 | -6 | -4 | 0 | -4 | -2 | -2 | -6 | -2 | -4 | -2 | -6 | -6 | -6 | -6 | -6 | -4 | -10 | -4 | -6 | -6 | -4 | -6 | -4 |
| 27 | 6 | 4 | 0 | 6 | 6 | 2 | 0 | 0 | 2 | 2 | 2 | 0 | 2 | 0 | 0 | -4 | 2 | 0 | 2 | -2 | -4 | 0 | -2 | -2 | -2 | -2 | -2 | -2 | -2 | 0 | -4 | 0 |
| 28 | 8 | -2 | 2 | 2 | -4 | 0 | -2 | -4 | -2 | 0 | 0 | -2 | 0 | -4 | -4 | -4 | 0 | -2 | -2 | -4 | -4 | -4 | -4 | -4 | -4 | -4 | -2 | -4 | -2 | -2 | -2 | -4 |
| 29 | 6 | 0 | 2 | 2 | 2 | 2 | 2 | -2 | 0 | 0 | 0 | 0 | 2 | 0 | 0 | -2 | 0 | 0 | 0 | -4 | -4 | -4 | -2 | -2 | -2 | -4 | -2 | -4 | -2 | -2 | -2 | -4 |
| 30 | 8 | -4 | 0 | 2 | -2 | 2 | 0 | -4 | -4 | -2 | 0 | -2 | -2 | 0 | 0 | -4 | -2 | -2 | 0 | -6 | -4 | -4 | -4 | -4 | -4 | -6 | -4 | -4 | -4 | -2 | -4 | -2 |
| 31 | 6 | 4 | 6 | 6 | 0 | 4 | 4 | 0 | 0 | 0 | 4 | 0 | 2 | 0 | 2 | -2 | 2 | 0 | 2 | -2 | -2 | 0 | 0 | 0 | -2 | -4 | 0 | 0 | -2 | 0 | 0 | 0 |
| 32 | 8 | -2 | 2 | 6 | -2 | 0 | 0 | -2 | -2 | -4 | 0 | -4 | -2 | -2 | 0 | -4 | -2 | 0 | 0 | -6 | -6 | -2 | -4 | -4 | -4 | -6 | -4 | -4 | -4 | 0 | -4 | -2 |

Again, the Walsh coefficients having absolute values below a preselected filter level are removed from Table 3 to produce Table 4, which lists the first 32×32 filtered lower order Walsh coefficients for the image of FIG. 9B. Again, it is seen that only three of the Walsh coefficients have absolute values which exceed that of the filter level. (Again, it should be noted that coefficients (2,2) and coefficients (3,3) of Tables 3 and 4 are slightly different due to system noise at different data taking time.

TABLE 4

| | WALS COEFFICIENTS |
|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1 | 60 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 50 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 36 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 21 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 23 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 26 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 27 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 28 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 29 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 32 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

It is seen from Tables 2 and 4 that the significant spectral components are distributed among the very few lower order Walsh coefficients of the image being analyzed. Further, it is seen that each Walsh coefficint matrix of an image is unique in itself and can be distinguished from other matrices. Specifically, it is seen that the coefficient (2,2) of Table 2 has a value of −54, whereas the same coefficient for Table 4 has a value of 50. It is thus seen that each of the images of FIGS. 9A and 9B, respectively, has an unique coefficient matrix that can be used to distinguish it from the matrices of other images being analyzed by the present invention.

Obviously, the minicomputer 34 can be programmed so as to recognize the coefficient matrix of a particular image that is desired to be detected. Because the Walsh coefficient matrices are produced by the optical masking, a high number of Walsh coefficients can be produced in a given period of time without the requirement of high computer calculating power which would definitely be necessary if these Walsh coefficients were produced entirely electronically. In other words, by optically integrating the mask pattern, the method and apparatus of the present invention eliminates the need for the massive computer capacity that would be required to produce these Walsh coefficients entirely electronically.

It should be noted that some of the above-described aspects of the present invention were presented by the inventors' report entitled *Prototype Image Spectrum Analyzer (PSIA) For Cartographic Feature Extraction*, U.S. Army Corps of Engineers, ETL-0204, which is incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed is:

1. Apparatus, which comprises:
   a. means for generating a two dimensional Walsh function light pattern;
   b. transparency means for receiving said two dimensional Walsh function light pattern and for producing a masked pattern; and
   c. first means for receiving said masked pattern and for producing an electrical signal in accordance with same.

2. The apparatus as claimed in claim 1, wherein said generating means comprises means for generating at least two Walsh function light patterns.

3. The apparatus as claimed in claim 1, wherein said generating means comprises means for generating sequentially at least two Walsh function light patterns.

4. The apparatus as claimed in claim 1, wherein said generating means comprises:
   a. Walsh function means for generating a driving signal indicative of said Walsh function light pattern; and
   b. display means for receiving said driving signal and for producing said Walsh function light pattern in accordance with said driving signal.

5. The apparatus as claimed in claim 4, wherein said display means comprises plasma discharge display means.

6. The apparatus as claimed in claim 4, wherein said Walsh function means comprises:

a. Walsh function generator means for producing a control signal in accordance with said Walsh function light pattern; and b. driver means responsive to said control signal for supplying said driving signal.

7. The apparatus as claimed in claim 1, wherein said transparency means comprises a photographic image disposed substantially adjacent said Walsh function light pattern.

8. The apparatus as claimed in claim 1, wherein said first means comprises:

a. sensor means having a light sensor surface for supplying an output signal in accordance with the light intensity at said light sensor surface; and b. optical means for conveying said masked pattern to said light sensor surface.

9. The apparatus as claimed in claim 8, wherein said sensor means comprises photomultiplier means.

10. The apparatus as claimed in claim 8, wherein said optical means comprises lens means disposed on one side approximately one focal length from said masked pattern and on the other side adjacent said sensor means.

11. The apparatus as claimed in claim 1, further comprising analog coefficient processor means for receiving said electrical signal and for producing a digital signal in accordance with same.

12. The apparatus as claimed in claim 11, wherein said coefficient processor means comprises:

a. buffer means for receiving said electrical signal and for supplying a buffered electrical signal in accordance with same; and b. analog to digital converter means for receiving said buffered electrical signal and for providing said digital signal representative of same.

13. The apparatus as claimed in claim 11, further comprising digital data processor means under stored program control for receiving said digital signal.

14. The apparatus as claimed in claim 13, wherein said digital data processor means under stored program control comprises:

a. central processor means under said stored program control responsive to said digital signal;

b. input terminal means connected to said central processor means for supplying input information to said central processor means;

c. cathode ray tube display means connected to said central processor means for visually displaying information from said central processor means; and d. printer means connected to said central processor means for printing information from said central processor means.

15. Apparatus which comprises:

a. an image b. means for generating at least one two dimensional Walsh function light pattern and for illuminating said image with each said two dimensional Walsh function light pattern to produce a respective masked pattern;

c. means for receiving each said masked pattern and for producing an electrical signal in accordance with each said masked pattern; and d. analog to digital converter means for receiving each said electrical signal and for providing a digital signal representative of each said electrical signal;

and e. digital data processor means under stored program control for receiving each said electrical signal.

16. Apparatus which comprises:

a. an image;

b. first means for generating a two dimensional Walsh function light pattern and for illuminating said image with said two dimensional Walsh function light pattern to produce a masked pattern; and c. second means for receiving said masked pattern and for producing an electrical signal in accordance with same.

17. The apparatus as claimed in claim 16, wherein said image comprises a photographic negative.

18. The apparatus as claimed in claim 16, wherein said image comprises a transparency.

19. The apparatus as claimed in claim 16, wherein said first means comprises means for generating at least two Walsh function light patterns and for illuminating said image with each of said Walsh function light patterns to produce respective masked patterns.

20. The apparatus as claimed in claim 19, wherein said second means comprises means for receiving said masked patterns and for producing an electrical signal in accordance with each of said masked patterns.

21. The apparatus as claimed in claim 20, further comprising digital data processor means for receiving each said electrical signal.

22. The apparatus as claimed in claim 21, wherein said digital data processor means comprises processor means under stored program control for receiving each said electrical signal and for digitally processing same in accordance with said stored program control.

23. The apparatus as claimed in claim 16, wherein said first means comprises:

a. Walsh function generator means for generating means for generating a control signal representative of said Walsh function light pattern;

b. driver means responsive to said control signal for producing a driving signal in accordance with same; and c. display means for receiving said driving signal for producing said Walsh function light pattern in accordance with said driving signal, and for illuminating said image with said Walsh function light pattern to produce said masked pattern.

24. The apparatus as claimed in claim 16, wherein said second means comprises:

a. light sensor means having a sensor for producing an output signal representative of the light intensity supplied to said sensor; and b. means for conveying said masked pattern to said sensor.

25. The apparatus as claimed in claim 24, wherein said conveying means comprises optical means disposed between said masked pattern and said sensor for focusing said masked pattern onto said sensor.

26. The apparatus as claimed in claim 25, wherein said optical means comprises at least one lens.

27. The apparatus as claimed in claim 24, wherein said light sensor means comprises a photomultiplier means.

28. The apparatus as claimed in claim 24, further comprising third means for receiving said output signal and for converting said output signal to a digital signal.

29. The apparatus as claimed in claim 28, wherein said third means comprises analog to digital converter means having an input for receiving said output signal and an output for furnishing said digital signal.

30. Method comprising the steps of:

a. providing an image;

b. generating a two dimensional Walsh function light pattern;

c. illuminating said image with said two dimensional Walsh function light pattern to produce a masked pattern; and d. producing an electrical signal in accordance with said masked pattern, whereby said electrical signal is representative of the Walsh coefficient of said image.

31. The method as claimed in claim 30, further comprising the step of converting said electrical signal to a corresponding digital signal.

32. The method as claimed in claim 31, further comprising the step of processing using a digital data processor under stored program control said digital signal.

33. The method as claimed in claim 30, further comprising the step of electrically processing said electrical signal for obtaining the Walsh coefficient for said image.

34. The method as claimed in claim 33, further comprising the step of visually displaying said Walsh coefficient.

35. The method as claimed in claim 33, further comprising the step of printing said Walsh coefficient.

36. The method as claimed in claim 33, further comprising the step of storing said Walsh coefficient.

37. The method as claimed in claim 30, wherein the step of generating a Walsh function light pattern comprises the steps of:

a. generating a driving signal indicative of said Walsh function light pattern; and b. producing said Walsh function light pattern in accordance with said driving signal.

38. The method as claimed in claim 30, wherein the step c comprises the steps of:

a. conveying said masked pattern to a first region; and b. transforming said masked pattern at said first region into said electrical signal.

39. The method as claimed in claim 38, wherein step a optically conveys said masked pattern.

* * * * *